(12) United States Patent
Zhang et al.

(10) Patent No.: US 9,326,357 B2
(45) Date of Patent: Apr. 26, 2016

(54) LIGHTING DEVICE, LOCAL DEVICE, LIGHTING CONTROL SYSTEM, AND LIGHTING CONTROL METHOD

(71) Applicants: Guanglei Zhang, Beijing (CN); Jichuan Zheng, Beijing (CN)

(72) Inventors: Guanglei Zhang, Beijing (CN); Jichuan Zheng, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 153 days.

(21) Appl. No.: 14/201,998

(22) Filed: Mar. 10, 2014

(65) Prior Publication Data

US 2014/0252963 A1    Sep. 11, 2014

(30) Foreign Application Priority Data

Mar. 11, 2013  (CN) .......................... 2013 1 0075695

(51) Int. Cl.
*H05B 37/02* (2006.01)

(52) U.S. Cl.
CPC ........ *H05B 37/0218* (2013.01); *H05B 37/0272* (2013.01); *Y02B 20/46* (2013.01)

(58) Field of Classification Search
CPC .. H05B 37/02; H05B 37/029; H05B 37/0218; H05B 37/0227
USPC .................................................. 315/149–159
See application file for complete search history.

(56) References Cited

U.S. PATENT DOCUMENTS

| | | | | |
|---|---|---|---|---|
| 7,619,366 B2* | 11/2009 | Diederiks | .......... | H05B 37/0227 250/214 AL |
| 8,183,785 B2 | 5/2012 | Ribas et al. | | |
| 2007/0103007 A1* | 5/2007 | Miki | .................. | H05B 37/0272 307/149 |
| 2009/0208221 A1* | 8/2009 | Sasai | ...................... | H04B 1/707 398/130 |
| 2010/0213854 A1* | 8/2010 | Rains, Jr. | .................. | F21K 9/00 315/149 |
| 2013/0293118 A1* | 11/2013 | Nagashima | ........ | H05B 37/0272 315/155 |
| 2015/0137686 A1* | 5/2015 | Aliakseyeu | ........ | H05B 37/0227 315/153 |

OTHER PUBLICATIONS

"RE200B Pyroelectric Infrared Sensor," Pyroelectric Infrared Sensor, Nicera Product, [online], Contin Technology Limited, Alibaba.com, the Internet URL: http//continltd.en.alibaba.com/product/349567289-210453812/RE200B_Pyroelectric_Infrared_Sensor.html, 1999-2013, 2 pages.

* cited by examiner

*Primary Examiner* — Lincoln Donovan
*Assistant Examiner* — Thomas Skibinski
(74) *Attorney, Agent, or Firm* — Oblon, McClelland, Maier & Neustadt, L.L.P.

(57) ABSTRACT

A lighting control method for use in a lighting control system is disclosed. The lighting control method includes acquiring an influence coefficient of each of lighting devices on at least one local device based on a measured amount of invisible beams and a measured amount of visible light, the influence coefficient representing an influence level of each of the lighting devices on the local device; and acquiring a dimmer level of each of visible light sources based on a corresponding one of the influence coefficients to control the amount of the visible light measured at a position of the local device such that the measured amount of the visible light reaches or approaches a target lighting amount of the local device.

10 Claims, 10 Drawing Sheets

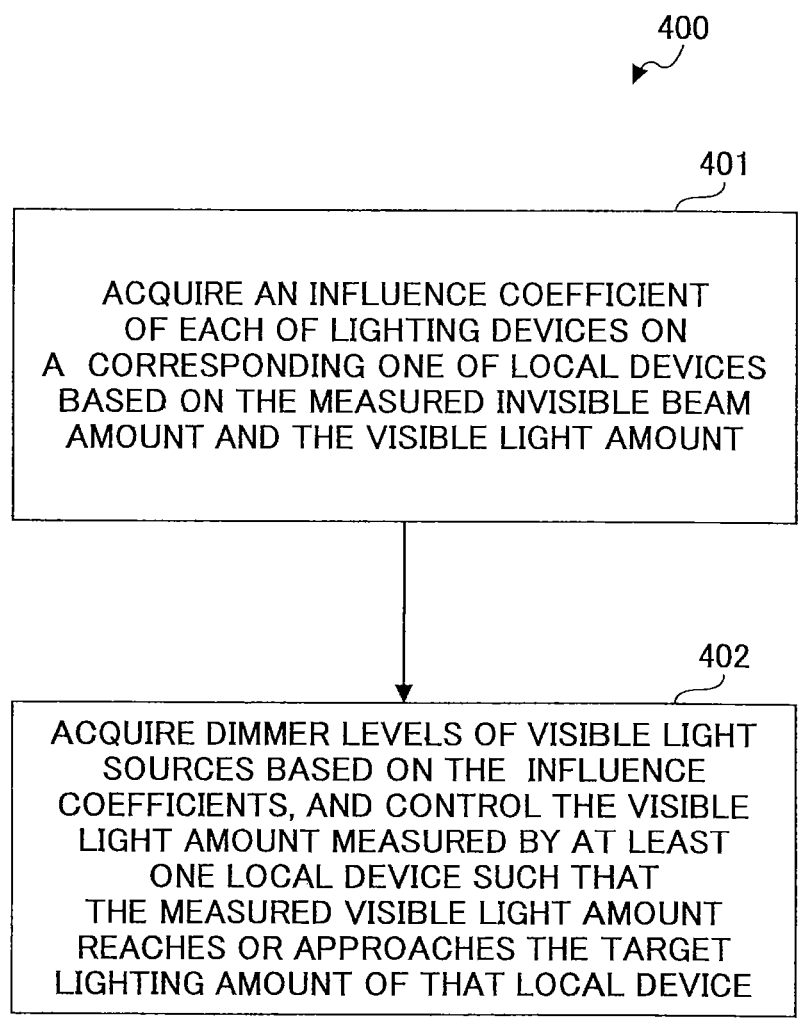

LIGHTING DEVICE, LOCAL DEVICE, LIGHTING CONTROL SYSTEM, AND LIGHTING CONTROL METHOD

BACKGROUND OF THE INVENTION

1. Field of the Invention

The disclosures discussed herein relate to a lighting control technology to control lighting devices. The disclosures specifically relate to a lighting control technology to compute influence coefficients of the lighting devices on local devices located at respective positions of the lighting devices using invisible beams to control the lighting devices based on the respective influence coefficients.

2. Description of the Related Art

Current intelligent lighting control systems employs various sensors to provide unique lighting environments.

For example, a traditional lighting system generally provides lighting devices such as multiple lights in a large hall. Visible light sources inside such lighting devices are configured to emit amounts of light based on dimmer levels. Hence, such a lighting system controls amounts of light emitted from the lighting devices by controlling respective dimmer levels so as to cause lighting amounts at certain positions in the large hall to reach or approach target lighting amounts. Such a lighting control technology needs to cause lighting amounts at certain positions to reach or approach respective target lighting amounts by constantly conducting experiments on amounts of light emitted from the visible light sources of the lighting devices, acquiring measured feedbacks and repeatedly adjusting the lighting amounts. However, in the above technology, repeatedly and randomly controlling amounts of light emitted from the visible light sources of the lighting devices may cause some adverse effects such as overshooting, degraded adjustment effects, or flickering of lights.

In the related art technology, the influence coefficients are computed by sequentially activating visible light sources of the lighting devices and measuring the lighting amount at which a certain sensor is located. However, in the constantly conducted experiments, sequentially and repeatedly adjusting the amount of light emitted from each of the lighting devices may allow people to perceive the adjustments as flickering of the lighting devices, may allow people to feel disturbed, or may even harm people's health. Repeated and random adjustments of amounts of emission light may cause adverse effects such as overshoot, degraded adjustment effects or flickering of lights. In particular effects, periodical flickering (e.g., supplying power via alternating current of 50 Hz) may cause an operator to visually misidentify electric rotational speeds and directions, which may further cause critical accidents. The following two related art documents each specifically describe implementation methods of the related art lighting control system.

RELATED ART DOCUMENTS

Patent Document

Patent Document 1: U.S. Patent Application Publication No. 2007/0103007 A1
Patent Document 2: U.S. Pat. No. 8,183,785 B2

Patent Document 1 is U.S. Patent Application Publication No. 2007/0103007 A1 disclosed by Miki et al. that was published by the USPTO on May 10, 2007. These related art disclosed in the publication pertains to a distributed lighting control system that includes lighting devices each capable of controlling corresponding light emission based on the measurements from a lighting sensor. In this related art technology, in order to reduce energy consumption, a desired one of light emitting sources is selected as a candidate light emitting source via a (directional or non-directional) infrared emitter, and luminance of each of the light emitting sources is gradually adjusted based on the lighting amount of visible light measured at a desired position by causing each of the light emitting sources to gradually increase or decrease the corresponding luminance to cause the lighting amount of the visible light measured at the desired position to reach or approach a target lighting amount. However, in the related art technology disclosed in Patent Document 1, it may be necessary to select a desired light emitting source by the infrared emitter alone. Further, the lighting amount at the desired position may still need to be measured by causing the light emitting sources to gradually increase or decrease their luminance of the visible light, which may cause flickering of lights. Further, in the related art technology disclosed in Patent Document 1, intervals of the luminance of such a gradually increasing or decreasing visible light may be increased, which may cause adverse effects such as overshooting or degraded adjustment effects. Moreover, this related art technology disclosed in Patent Document 1 is a distributed control system and is not a central control system.

Patent Document 2 is U.S. Pat. No. 8,183,785 B2 disclosed by Boleko Ribas et al., that was published by the USPTO on May 22, 2012. Patent Document 2 illustrates a central emission control system that includes a CCD (charge-coupled device) camera utilized as a sensor to measure light distribution under indoor environment. In this related art technology disclosed in Patent Document 2, a result of the lighting amount at a certain position is recorded every time each of the visible light sources of the lighting devices is sequentially switched on or off, which provide influence data abbreviated as influence coefficients, which indicate how the lighting amount of each of the lighting devices at a certain position is affected. Then, a final dimmer level of each of the lighting devices is computed based on the influence data using an iterative control mechanism based on ANN (Artificial Neural Networks). However, in the related art technology disclosed in Patent Document 2, the influence data may still need to be acquired by sequentially switching on or off each of the lighting devices, which may cause flickering of the lights. Hence, it may be desirable to provide a lighting control technology that is capable of avoid flickering or the like of the lights with a rapid operation efficiently reducing electric energy consumption.

SUMMARY OF THE INVENTION

Accordingly, it is a general object in one embodiment of the present invention to provide a lighting control technology capable of acquiring influence coefficients of each of lighting devices on a corresponding one of local devices located at respective positions of the lighting devices utilizing invisible beams, and individually controlling the lighting devices based on the respective acquired influence coefficients.

One aspect of the present disclosures is to provide a lighting control method for use in a lighting control system.

According to one aspect of the embodiment, there is provided a lighting control method for use in a lighting control system, the lighting control system including a plurality of lighting devices each including visible light sources for emitting visible light based on dimmer levels of the respective lighting devices; and at least one local device including a visible light sensor for measuring an amount of visible light in the local device, where one of each of the lighting devices and the at least one local device includes an invisible beam emitting source for emitting invisible beams simulating characteristics of visible light, and the other one of each of the lighting devices and the at least one local device includes an invisible beam sensor for measuring an amounts of invisible beams emitted from the invisible beam emitting source. The lighting control method includes acquiring an influence coefficient of each of the lighting devices on the at least one local device based on the measured amount of invisible beams and the measured amount of visible light, wherein the influence coefficient represents an influence level of each of the lighting devices on the at least one local device; and acquiring a dimmer level of each of the visible light sources based on a corresponding one of the influence coefficients to control the amount of the visible light measured at a position of the at least one local device such that the measured amount of the visible light reaches or approaches a target lighting amount of the at least one local device.

According to another aspect of the embodiment, there is provided a lighting control system that includes a plurality of lighting devices each including visible light sources for emitting visible light based on dimmer levels of the visible light sources; at least one local device including a visible light sensor for measuring an amount of visible light in the local device, one of each of the lighting devices and the at least one local device including an invisible beam source for emitting invisible beams simulating characteristics of visible light, and the other one of each of the lighting devices and the at least one local device including an invisible beam sensor for measuring an amount of invisible beams emitted from the invisible beam emitting source; and a controller configured to acquire an influence coefficient of each of the lighting devices on the at least one local device based the measured amount of the invisible beams and the measured amount of visible light, the influence coefficient representing an influence level of the lighting devices on the at least one local device, and to acquire a dimmer level of each of the visible light sources based on a corresponding one of the influence coefficients to control the amount of the visible light measured at a position of the at least one local device such that the measured amount of the visible light reaches or approaches a target lighting amount in the at least one local device.

According to another aspect of the embodiment, there is provided a lighting device that includes visible light sources for emitting visible light to at least one local device based on a dimmer level thereof; one of an invisible light beam emitting source for emitting invisible beams simulating characteristics of visible light and an invisible beam sensor for measuring an amount of invisible beams emitted from the invisible light beam emitting source, the other one of the invisible light beam emitting source and the invisible beam sensor being located inside the at least one local device; and a lighting device controller configured to acquire an influence coefficient of the lighting device based on the measured amount of invisible beams and an amount of visible light measured by the at least one local device, the influence coefficient representing an influence level of the lighting device on the at least one local device, and to acquire dimmer levels of the visible light sources based on the influence coefficient to control the amount of the visible light measured at a position of the at least one local device such that the measured amount of the visible light reaches or approaches a target lighting amount in the at least one local device.

According to another aspect of the embodiment, there is provided a local device that includes a visible light sensor for measuring an amount of visible light emitted from a plurality of lighting devices; one of an invisible light beam emitting source for emitting invisible beams simulating characteristics of visible light and an invisible beam sensor for measuring an amount of invisible beams emitted from the invisible light beam emitting source, the other one of the invisible light beam emitting source and the invisible beam sensor being located inside each of the lighting devices; and a local device controller configured to acquire an influence coefficient of each of the lighting devices on the local device based the measured amount of the invisible beams and the measured amount of visible light, the influence coefficient representing an influence level of the lighting devices on the local device, and to transfer target dimmer levels of respective visible light sources to the lighting devices based on the acquired influence coefficients to cause the visible light amount measured by the local device to reach or approach a target lighting amount in the local device.

Other objects, features and advantages of the present invention will become more apparent from the following detailed description when read in conjunction with the accompanying drawings.

BRIEF DESCRIPTION OF THE DRAWINGS

FIG. 4A is a flowchart illustrating exemplified steps performed by a central controller in the lighting control system illustrated in FIG. 3;

DETAILED DESCRIPTION OF THE PREFERRED EMBODIMENTS

In the following, a description will be given of embodiments of the present invention based on examples by referring to the accompanying drawings. Further, exemplified embodiments are specifically illustrated in the accompanying drawings. The embodiments are illustrated in combination of specific examples; however, the embodiments are not limited to the combination of the specific examples. Although the embodiments are described in detail below, it should be understood that various changes, substitutions, and alterations may be made hereto without departing from the spirit and scope of the invention. Note that steps of the method illustrated below may be implemented by any functional block or functional arrangement, and the functional block or functional arrangement may be implemented as a physical entity or a logical entity, or a combination of the physical entity and the logical entity.

The disclosures are illustrated in the following order.
1. A simplified block diagram of a lighting control system according to the first embodiment;
2. A hardware configuration of an applied lighting control system according to the embodiment;
3. A lighting control system according to the first embodiment;
4. A lighting control system according to a second embodiment;
5. A lighting control system according to a third embodiment;
6. A lighting control system according to a fourth embodiment;
7. A lighting control method according to an embodiment;
8. A lighting device according to an embodiment; and
9. A local device according to an embodiment.

In the following, detailed description is given of components of embodiments; however, the embodiments are not limited to the detailed description.

1. A Simplified Block Diagram of a Lighting Control System According to a First Embodiment FIG. 1 a simplified block diagram illustrating an example of a lighting control system according to an embodiment.

Figure 1:
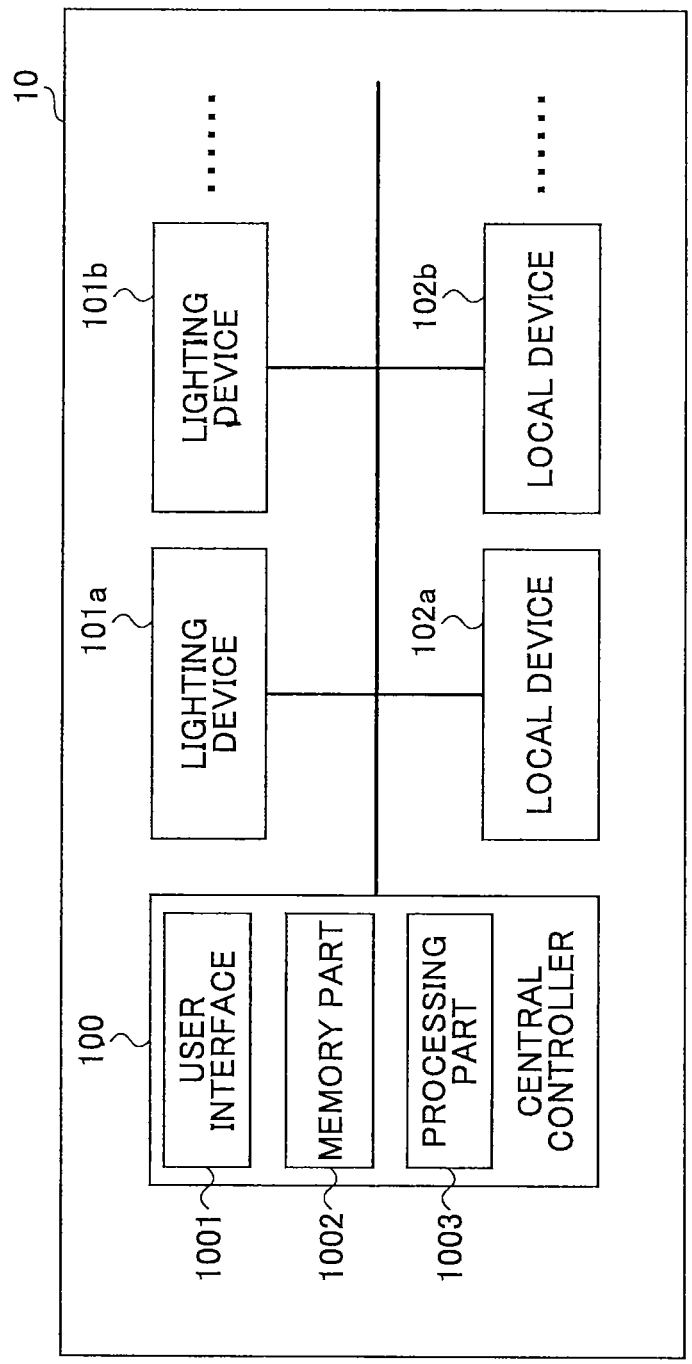
FIG. 1 is a simplified block diagram illustrating an example of a lighting control system of an embodiment.

As illustrated in FIG. 1, a lighting control system 10 includes plural lighting devices 101a, 101b, . . . , at least one local device 102a, 102b, . . . , and a central controller 100. The central controller 100 includes a user interface 1001, a memory part 1002, and a processing part 1003. These lighting devices 101 may be lights that are located on a ceiling or walls of an lighting environment such as a large hall, a theater, or an office, and at least one local device 102 may generally be located at various positions. For example, the local device 102 may be carried by a user, may be moved, or may be fixed at a certain position. The central controller 100 may be used for controlling data transmission and data processing simultaneously between the lighting devices 101 and the local device 102. As illustrated in FIG. 1, the central controller 100 is illustrated at a position between the lighting devices 101 and the local devices 102. However, the position of the central controller 100 is not limited to the position between the lighting devices 101 and the local devices 102. The central controller 100 may be placed inside the lighting device, inside the local device, or other locations. The central controller 100 is merely an example, and a distributed controller may be employed to exhibit control effects instead of the central controller 100.

Further, a structural configuration of the lighting control system illustrated in FIG. 1 is merely an example, but is not limited to this example. Examples of the structural configuration are illustrated below.

2. A Hardware Configuration of an Applied Lighting Control System According to the Embodiment FIG. 2 is a hardware configuration diagram illustrating an example of an applied lighting control system according to the embodiment.

Figure 2:
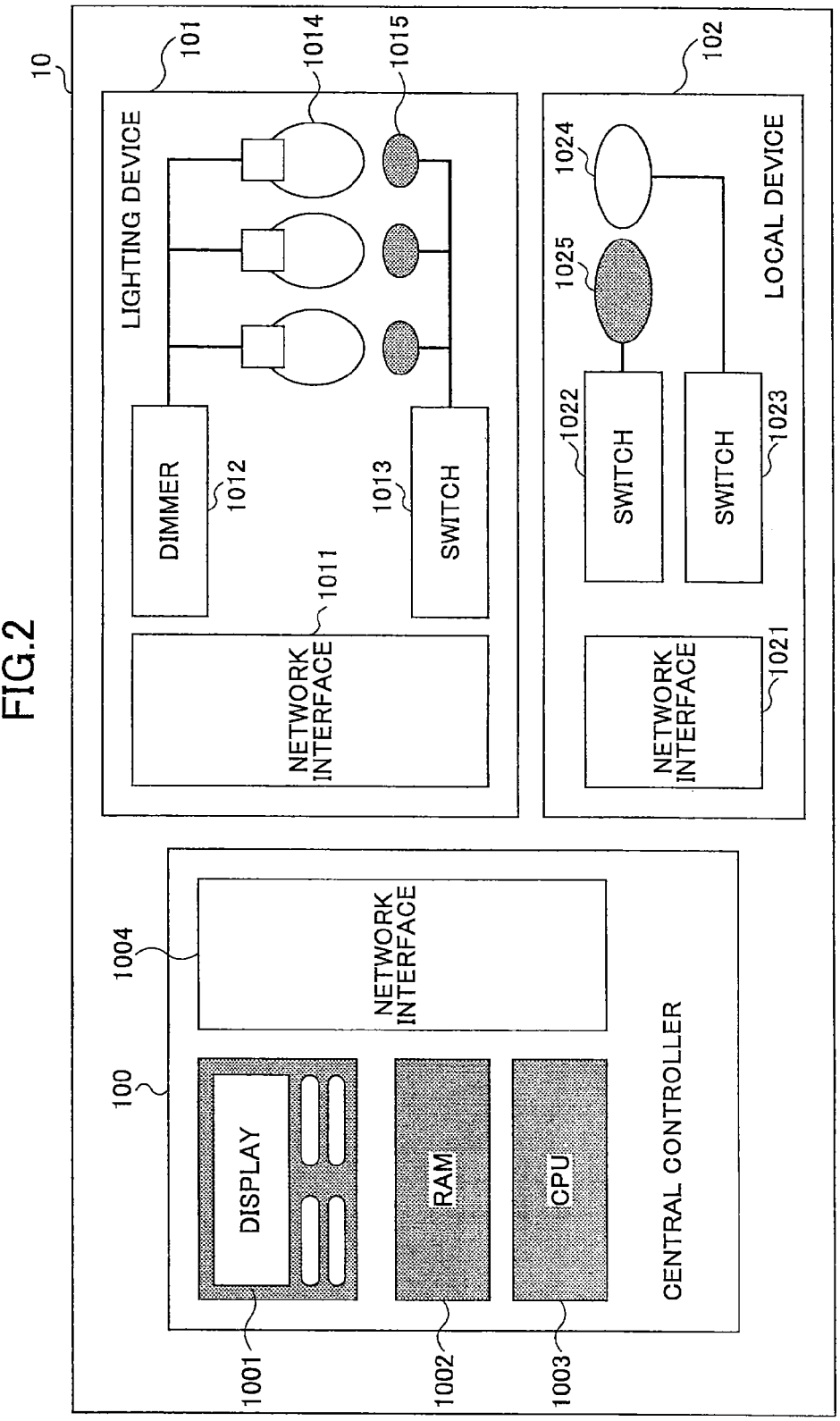
FIG. 2 is a hardware configuration diagram illustrating an applied example of the lighting control system according to the embodiment.

FIG. 2 illustrates internal hardware configurations of the lighting devices 101, the local devices 102, and the central controller 100 inside the lighting control system 10. Specifically, the lighting device 101, for example, includes plural visible light sources 1014 serving as lights that are controlled by a (selectable) same or different dimmers 1012. The dimmer 1012 is configured to control emitting amounts of the visible light sources 1014 based, for example, on a dimmer level, by following instructions (e.g., instructions for controlling the dimmer level) transmitted by the central controller 100 via a network interface 1011. In FIG. 2, beam emitting sources (e.g., invisible beam emitters) or beam sensors (e.g., invisible beam sensors) 1015 are illustrated at respective positions close to the visible light sources 1014. The beam emitting sources or beam sensors 1015 may be controlled by a (selectable) switch 1013 based on instructions transmitted from the central controller 100 via the network interface 1011.

The local device 102, for example, includes a visible light sensor 1024 controlled by a switch 1023, and a beam sensor (beam emitter) 1025 controlled by a switch 1022. The two switches 1023 and 1022 are configured to follow instructions transmitted from the central controller 100 via a network interface 1021.

The central controller 100, for example, includes a display 1001, a RAM (random access memory) 1002, a CPU (central processing unit) 1003, and a network interface 1004.

Note that FIG. 2 merely illustrates examples of detailed hardware configurations inside the lighting device 101 and the local device 102. However, the detailed hardware configurations inside the lighting device 101 and the local device 102 are not limited to the above examples. Various alterations may be made to the hardware configurations according to practical conditions insofar as the functions and effects may be exhibited.

3. A Lighting Control System According to a First Embodiment

Figure 3:
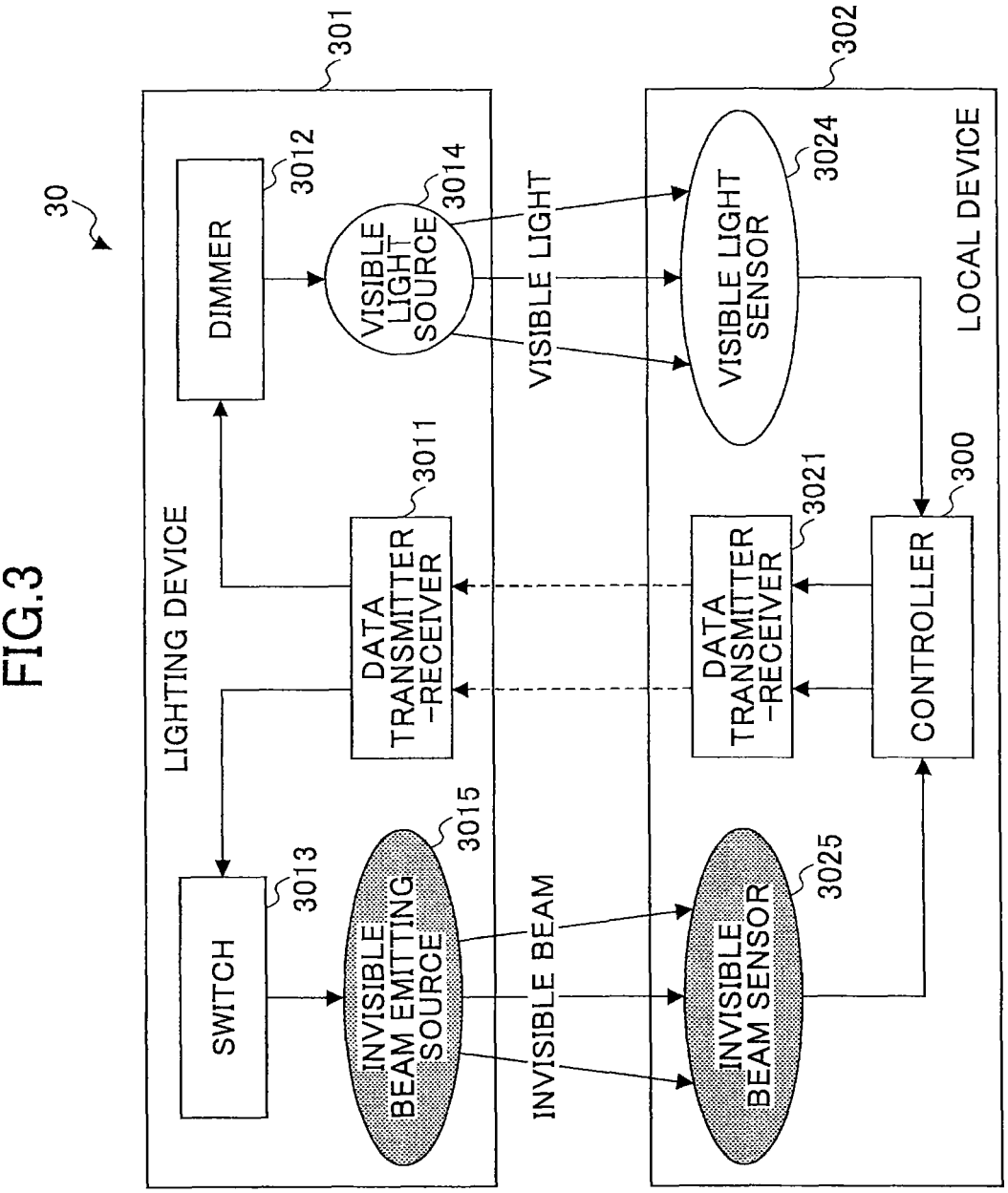
FIG. 3 a block diagram illustrating an example of a lighting control system according to a first embodiment.

FIG. 3 is a block diagram illustrating an example of a lighting control system 30 according to a first embodiment.

The lighting control system 30 includes a plurality of lighting devices (exemplified as one lighting device in FIG. 3) 301; and at least one local device 302. Each of the lighting devices 301 includes a visible light source 3014 configured to emit visible light based on dimmer levels of the respective lighting devices 301, and an invisible beam emitting source 3015 configured to emit invisible beams that simulate characteristics of visible light. The local device 302 includes a visible light sensor 3024 configured to measure amounts of the visible light emitted from the visible light sources 3014 as visible light amounts, an invisible beam sensor 3025 configured to measure the invisible beams emitted from the invisible beam emitting sources 3015, and a controller 300 configured to acquire an influence coefficient of each of the lighting devices 301 on the local device 302 based on the measured visible light amounts and the measured invisible beams, to acquire target dimmer levels of the visible light sources 3014, and to cause the measured visible light amounts measured by the local device 302 at respective positions to reach or approach a target lighting amount in the local device 302. Note that the influence coefficient represents an influence level of the visible light amount of each of the lighting devices 301 on a corresponding one of the local devices 302. In the description, "the visible light (lighting) amount approaching the target lighting amount" indicates that the difference between the visible light (lighting) amount and the target lighting amount is less than a predetermined threshold.

FIG. 3 illustrates configuration examples of the lighting device 301 and the local device 302. However, the configurations of the lighting device 301 and the local device 302 are not limited to these examples. In FIG. 3, the local device 302 includes the (central) controller 300; however, the configuration of the local device 302 is not limited to this example.

FIG. 3 illustrates a configuration example of the lighting device 301 (normally attached to the ceiling) that includes a (selectable) data transmitter-receiver 3011, and a (selectable) dimmer 3012. However, the configuration of the lighting device 301 is not limited to this example. Simultaneously, a configuration example of the local device 302 (normally carried by a user or placed at a certain position) includes a (selectable) data transmitter-receiver 3021. However, the configuration of the local device 302 is not limited to this example.

The invisible beam emitting source 3015 is configured to emit invisible beams (e.g., infrared radiation or microwaves). The invisible beams used herein may, for example, be incapable of passing round impenetrable obstacles such as furniture or a human body. That is, the invisible beams may be able to simulate characteristics of visible light, such as propagation characteristics that are attenuated with distance and exhibit incapability of passing round impenetrable obstacles such as furniture or a human body. For example, infrared radiation is capable of simulating characteristics of visible light. When infrared radiation (the wavelength range of 780 nm to 1 mm) is emitted to a floor by utilizing an infrared radiation emitting source of a remote controller of a TV, and the infrared radiation emitting source and the visible light source are located close to each other, an area of the floor covered by the infrared radiation is basically the same as an area of the floor covered by the visible light. There are furthermore invisible beams capable of simulating additional characteristics of visible light other than infrared radiation or microwaves.

The selectable data transmitter-receiver 3011 inside the lighting device 301 is configured to perform communications with the selectable data transmitter-receiver 3021 inside the local device 302. In practical application, since the local device is normally carried by a user, a wireless data transmitter-receiver may be preferred compared to a wired data transmitter-receiver. Such a wireless data transmitter-receiver may have any communication system. For example, a communications system of the wireless data transmitter-receiver is not limited to those for infrared radiation, wireless radio waves, microwaves, ultrasonic waves, and the like. A communications protocol may be any applicable system. For example, the system of the communication protocol is not limited, for example, to those for a LAN (wireless local area network), Bluetooth, or Zigbee.

The visible light source 3014 is a light or a combination of lights that are controlled by the dimmer 3012, and a configuration of the dimmer 3012 is determined based on characteristics of the visible light source 3014. For example, a voltage of an incandescent lamp may be changed by utilizing a slidable variable resistor that is connected in series with the incandescent lamp. Note that an emitting amount of the incandescent lamp may also be controlled by an SCR (silicon controlled rectifier), or a cutting-edge phase dimmer other than slidable variable resistor. In a case of a fluorescent lamp, a voltage (amplitude modulation) or a current waveform (phase modulation) of the fluorescent lamp may be changed by utilizing a dimmer electronic ballast. In a case of an LED (light-emitting diode) light, an emitting amount of the LED may be changed by utilizing a controllable constant-current source or a PWM (pulse width modulation) technology. Each of the dimmer methods has own advantages and disadvantages such as overall energy consumption, flickering effects, non-uniform color after being dimmed, and contamination on transmission networks. The advantages and disadvantages of the dimmer methods may be considered in practical applications.

In FIG. 3, the local device 302 (normally located close to the floor) includes the invisible beam sensor 3025, the visible light sensor 3024, the central controller 300, and the selectable data transmitter-receiver 3021.

The invisible beam sensor 3025 is configured to measure an invisible beam amount (or intensity) emitted from the invisible beam emitting source 3015. For example, the invisible beam sensor 3025 may measure the amount of infrared radiation emitted from the invisible beam emitting source 3015 by utilizing a pyroelectric infrared sensor and an AD (analog-to-digital) converter.

The (central) controller 300 is configured to read the measured result ($mW/cm^2$). The measured result, that is, the invisible beam amount may be used to acquire an influence coefficient between each of the visible light sources and a corresponding one of the visible light sensors.
Information on the communications with the central controller 300 may be managed by utilizing the data transmitter-receiver 3021 similar to the data transmitter-receiver 3011.

The visible light sensor 3024 is configured to measure a visible light amount (the wavelength range of 380 to 730 nm) emitted from the visible light source 3014 and/or another light source (e.g., sunlight). For example, the visible light sensor may be a photocell, an illuminometer, a spectrometer, or the like that is capable of providing a value (e.g., illuminance (Lux)) of the visible light amount based on consideration of a specific request and electric energy consumption. The controller 300 is further configured to read the measured result of the visible light amount (Lux).

Note that in this example, the visible light amount, which is emitted from the visible light source 3014 and is measured by the visible light sensor 3024 inside the local device 302 located at a certain position, is proportional to the invisible beam amount, which is emitted from the invisible beam emitting source 3015 and is measured by the invisible beam sensor 3025 located at the same position as the visible light sensor 3024. Or there may be a single emission and monotonous mapping relationship (e.g., a cubic polynomial relationship: in this condition, a linear approximation relationship is obtained between the two measured results) between the two measured results (i.e., the measured visible light amount and the measured invisible beam amount). That is, when characteristics of visible light, such as propagation characteristics that are attenuated with distance and exhibit incapability of passing round impenetrable obstacles such as furniture or a human body, are simulated, and each of the invisible beam emitting sources is sequentially cause to emit invisible beams based on the simulated characteristics, there is a proportional relationship between the invisible beam amount emitted from each of the invisible beam emitting sources measured by a corresponding one of the invisible beam sensors at respective positions and the influence coefficient of the visible sensor at the position of the visible light source corresponding to the invisible beam emitting source. Hence, an invisible beam amount emitted from each of the invisible beam emitting sources that is measured by a corresponding one of the invisible sensors at the respective positions may be set as an initial influence coefficient. For example, when an influence coefficient is acquired every time each of the invisible beam emitting sources is activated, it is not necessary to measure the influence coefficient by activating each of the visible light sources, which may prevent a disturbed condition such as flickering of the lights from occurring. This advantageous effect is only an example, and hence, the advantageous effect will not limit the embodiment.

Note that when the characteristics of the visible light are simulated by emission of invisible beams, each of the invisible beam emitting sources is not restricted to emit invisible beams at the same power. The invisible beam emitting sources may emit invisible beams at different power levels. In such a case, a proportional coefficient, in which the invisible beam amount emitted from a certain invisible beam emitting source and measured by the invisible beam sensor is proportional to the corresponding influence coefficient, may differ from another proportional coefficient obtained by a different invisible beam emitting source. Then, all the different proportional coefficients may be computed by finely adjusting the visible dimmer levels and recording the changes in the measured values of the visible light sensors.

When all the visible light sources 3014 are activated, the controller 300 finely adjusts a dimmer levels of the visible light sources and acquires the final influence coefficient based on the changes in the visible light amounts measured by the visible light sensors 3024 at one position or plural positions and the acquired initial influence coefficients, and acquires target dimmer levels of the plural visible light sources based on target lighting amounts in the local devices at the respective positions. Note that the target lighting amounts may be stored in the memory part 1002 of the central controller 100 as illustrated in FIG. 1, or may be acquired from another device via a network.

Figure 4B:
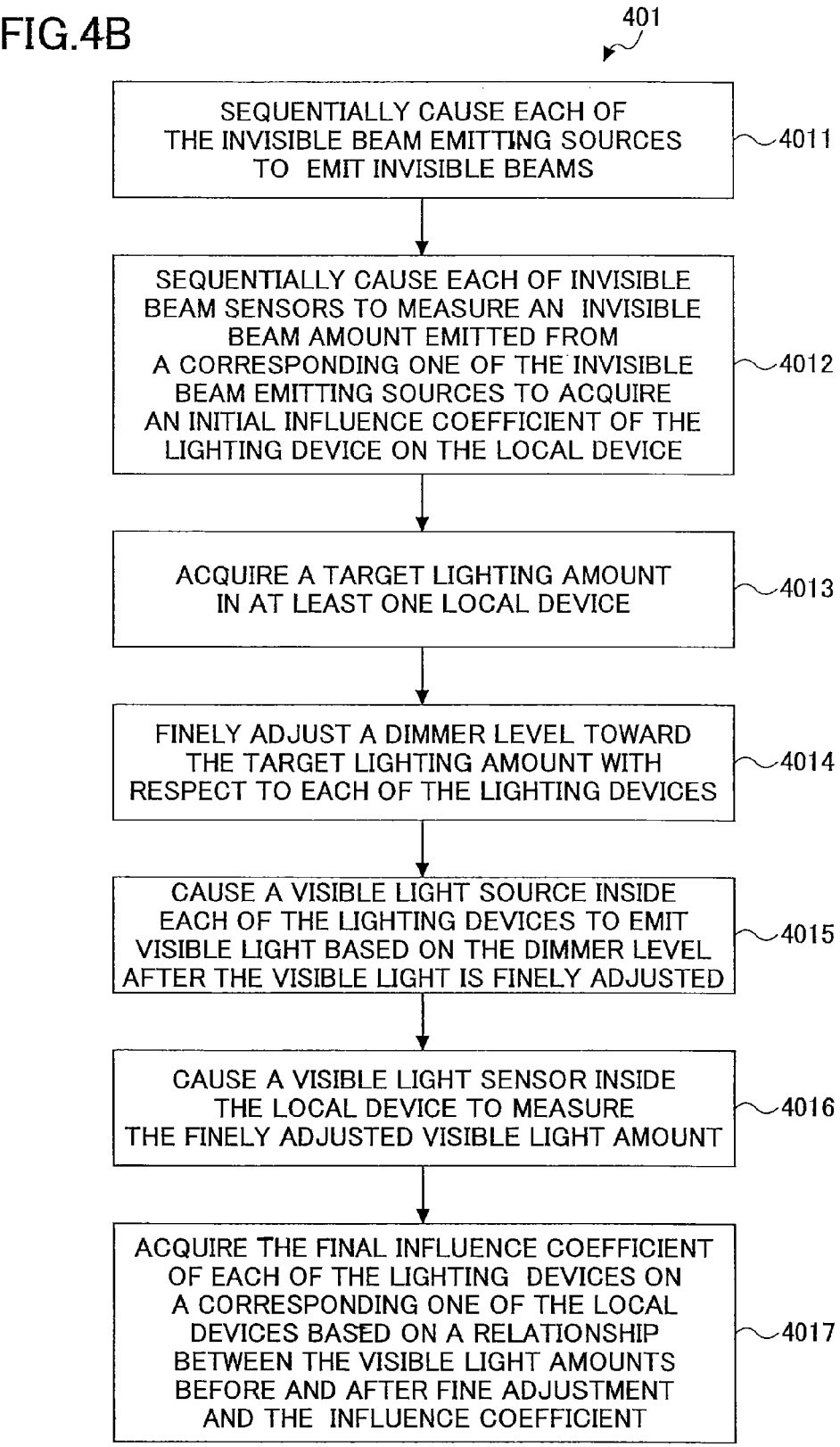
FIG. 4B is a flowchart illustrating exemplified steps performed by the central controller in the lighting control system illustrated in FIG. 3.
Figure 4C:
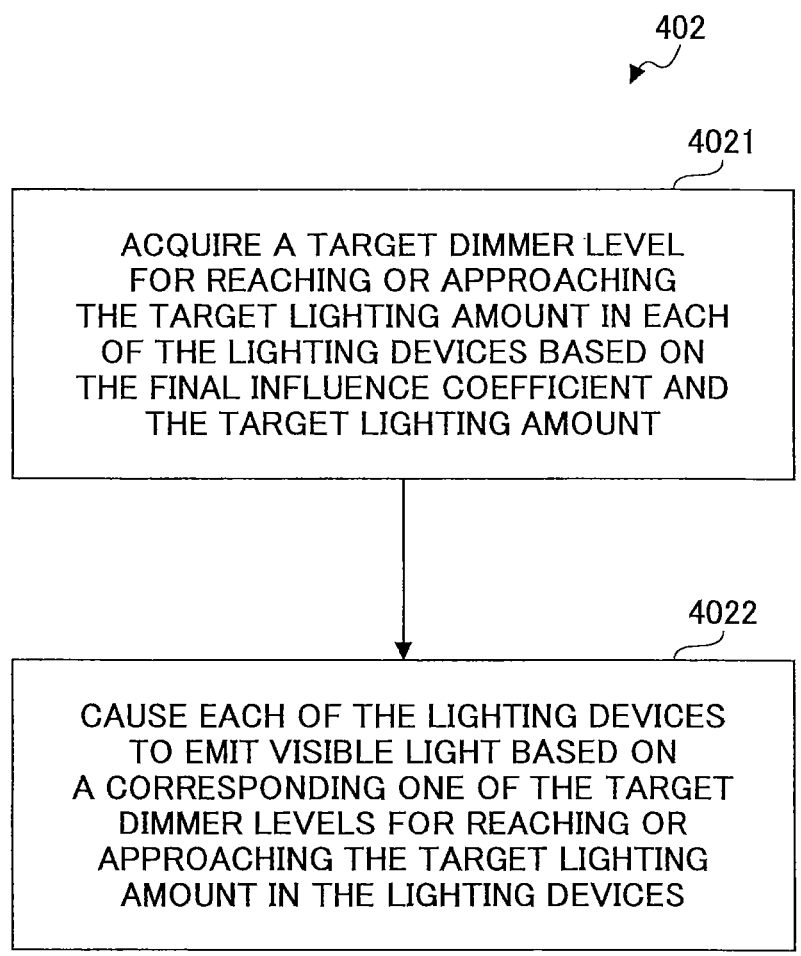
FIG. 4C is a flowchart illustrating exemplified steps performed by the central controller in the lighting control system illustrated in FIG. 3.

FIGS. 4A to 4C are flowcharts illustrating exemplified steps performed by the central controller 300 in the lighting control system 30 illustrated in FIG. 3.

Specifically, lighting, may for example, be controlled by following the steps illustrated below (see FIGS. 4A to 4C).

Referring to FIG. 4A, in step S401, an influence coefficient of each of the lighting devices on a corresponding one of the local devices is acquired based on the measured invisible beam amount and the visible light amount, where the influence coefficient represents an influence level of each of the lighting devices on a corresponding one of the local devices.

In step S402, dimmer levels of the plural visible light sources are acquired based on the influence coefficients, and the visible light amount measured by at least one local device is controlled such that the measured visible light amount reaches or approaches the target lighting amount of that local device.

A specific example of step S401 is illustrated as follows with reference to FIG. 4B.

In step S4011, each of the invisible beam emitting sources is sequentially caused to emit invisible beams.

In step S4012, each of the invisible beam sensors is caused to measure the invisible beam amount emitted from a corresponding one of the invisible beam emitting sources to acquire an initial influence coefficient of the lighting device on the local device.

In step S4013, a target lighting amount in at least one local device is acquired.

In step S4014, the dimmer level is finely adjusted in a direction toward the target lighting amount with respect to each of the lighting devices.

In step S4015, the visible light source inside each of the lighting devices is caused to emit visible light that is finely adjusted based on the dimmer level.

In step S4016, the visible light sensor inside the local device is caused to measure the finely adjusted visible light amount.

In S4017, the final influence coefficient of each of the lighting devices on a corresponding one of the local devices is acquired based on a relationship between the visible light amounts before and after fine adjustment and the influence coefficient.

A specific example of step S402 is illustrated as follows with reference to FIG. 4C.

In step S4021, a target dimmer level for reaching or approaching the target lighting amount in each of the lighting devices is acquired based on the final influence coefficient and the target lighting amount.

In S4022, each of the lighting devices is caused to emit visible light based on a corresponding one of the target dimmer levels for reaching or approaching the target lighting amount in the lighting devices.

Specifically, in S4011, a total number of m lighting devices 301 correspond to one local device 302 (m is an integer that is greater than 0). When the invisible beam emitting sources 3015 inside the lighting devices 301 are sequentially activated, a corresponding one of the invisible beam emitting sources 3015 is caused to emit the invisible beams. Then, in step S4012, the invisible beam sensor 3025 inside the local device 302 measures the amount of the invisible beams sequentially emitted from m invisible beam emitting sources 3015. For example, assume that the amount of the invisible beams of m invisible beam emitting sources 3015 is represented by the following formula (1).

$$d_j^{received} \; j=1,2,\ldots,m \qquad (1)$$

The influence coefficient of a jth lighting device 301 on the local device 302 is proportional to the amount of the measured invisible beams.

$$[a_1 a_2 \ldots a_m] = c[d_1^{received} d_2^{received} \ldots d_m^{received}] \qquad (2)$$

That is, an initial influence coefficient of the jth lighting device 301 on the local device 302 is acquired. In the above formula (2), c represents an unknown constant.

For example, it is assumed that the invisible beams are infrared radiation under the condition where there are three (m=3) lighting devices 301. The following formula (3) illustrates the respective amounts of infrared radiation emitted from the invisible beam emitting sources 3015 of the lighting devices 301 that are measured by the invisible sensor 3025 of the local device 302.

$$d_1^{received} = 12 \; (mW/cm^2)$$

$$d_2^{received} = 8 \; (mW/cm^2)$$

$$d_3^{received} = 3 \; (mW/cm^2) \qquad (3)$$

In practice, the respective measured values, $d_1^{received}$, $d_2^{received}$, $d_3^{received}$, that is, the absolute values are of little importance. It is sufficient to clarify a relationship between the measured values, and a specific unit of the measured values is of little importance.

Note that in the above example, it is assumed that the respective outputs (or intensities) of the invisible beam emitting sources 3015 are the same; however, the embodiment is not limited to this example of the respective outputs (or intensities) of the invisible beam emitting sources 3015 being the same. In a case where the respective outputs (or intensities) of the invisible beam emitting sources 3015 are different, the amount $d_j^{received}$, j=1, 2, . . . , m of the invisible beams measured in the above formula (2) is divided by the intensity value of the invisible beams emitted from the lighting devices 301. That is, it may be sufficient that each of the averaged values is obtained after averaging the amount of the invisible beams.

Then, it may still be assumed that each of the averaged values is proportional to the initial influence coefficient of the jth lighting device 301 in the local device 302.

The initial values a1, a2, and a3 acquired based on the above formula (2) are as follows.

$$a_1 = cd_1^{received} = 12c$$

$$a_2 = cd_2^{received} = 8c$$

$$a_3 = cd_3^{received} = 3c \quad (4)$$

Thereafter, the target dimmer levels of the visible light sources is inferred by using the initial influence coefficient to acquire a target lighting amount in the visible light sensor 3024. The target dimmer level may be computed by the following formula (5).

$$\begin{bmatrix} \hat{l}_1 \\ \hat{l}_2 \\ \vdots \\ \hat{l}_m \end{bmatrix} = \begin{bmatrix} l_1 \\ l_2 \\ \vdots \\ l_m \end{bmatrix} + [a_1 \; a_2 \; \cdots \; a_m]^+ (s^{target} - s^{measured}) \quad (5)$$

In the formula (5), $s^{target}$ represents the target lighting amount, and $s^{measured}$ represents a currently measured visible light amount.

In the above formula (5), $l_k$ represents a current dimmer levels of the visible light sources k, where k=1, 2, . . . , m. Further, $\hat{l}_k$ represents an optimal dimmer levels of the visible light sources k, where k=1, 2, . . . , m. "+" represents a pseudo-inverse matrix.

Since a constant c is unknown, the pseudo-inverse matrix of the matrix of the influence coefficients a1, a2, and 13 includes unknown coefficient $c^{-1}$.

In the practical application, each of the dimmer levels is finely adjusted in a direction toward the target lighting amount, an unknown parameter c is computed by measuring a change in the amount of visible light corresponding to the visible light sensor 3024. Since the above process is fine adjustment in the same direction toward the target lighting amount, any flickering may be prevented. However, the above fine adjustment is only an example, and is not limited to the fine adjustment in a direction toward the target. This advantageous effect is only an example, and hence, the advantageous effect is not limited to this example. Specifically, the pseudo-inverse matrix of the known influence coefficients is illustrated as follows.

$$[a_1 \; a_2 \; a_3]^+ = [12c \; 8c \; 3c]^+ = \frac{1}{217c} [12 \; 8 \; 3]^T \quad (6)$$

The above formula (6) is a known empirical formula. The target dimmer level is computed by the following formula (7).

$$\begin{bmatrix} \hat{l}_1 \\ \hat{l}_2 \\ \hat{l}_3 \end{bmatrix} = \begin{bmatrix} l_1 \\ l_2 \\ l_3 \end{bmatrix} + \frac{1}{217c} \begin{bmatrix} 12 \\ 8 \\ 3 \end{bmatrix} (s^{target} - s^{measured}) \quad (7)$$

The current dimmer levels are assumed as follows.

$$l_1 = 20\%$$

$$l_2 = 55\%$$

$$l_3 = 63\% \quad (8)$$

In step S4013, it is assumed that the currently measured visible light amount and the target lighting amount are obtained as follows.

$$s^{measured} = 420 \text{ (Lux)}$$

$$s^{target} = 500 \text{ (Lux)} \quad (9)$$

In step S4014, the dimmer level of each of the lighting devices is adjusted in a direction toward the target lighting amount. When a fine adjustment coefficient is assumed as $\epsilon = 0.5$, dimmer levels are newly set as illustrated below.

$$l_1' = (l_1 + 12 * \epsilon)\% = (20 + 12 * 0.5)\% = 26\%$$

$$l_2' = (l_2 + 8 * \epsilon)\% = (55 + 8 * 0.5)\% = 59\%$$

$$l_3' = (l_3 + 3 * \epsilon)\% = (63 + 3 * 0.5)\% = 64.5\% \quad (10)$$

In the equation (10), $l_1', l_2', l_3'$ represent the fine adjustment coefficients $\epsilon$ that indicate respective dimmer levels.

The fine adjustment coefficients $\epsilon$ may have other values. The above-described fine adjustment method in a direction toward the target lighting amount may prevent excessive adjustment, and be able to rapidly and accurately adjust the dimmer levels so as to cause the measured visible light amount to reach or approach the target lighting amount.

Note that the amounts of finely adjusting the dimmer levels of the lighting devices, such as $12 * \epsilon$, $8 * \epsilon$, and $3 * \epsilon$, are proportional to the initial influence coefficients 12c, 8c, and 3c of the respective lighting devices on the specific local device. The advantages of the above-described settings may, for example, be capability of repeatedly adjusting the dimmer level of a relatively large-sized lighting device having an influence of the lighting amount on a certain position (the relatively large-sized lighting device may frequently be located close to that certain position), such that the measured visible light amount may be able to reach or approach the target lighting amount with a small amount of electric energy consumption. Hence, the electric energy may be reduced in this manner. Further, when each of the local devices needs to reach or approach the target lighting amount of own local device, the dimmer level of the lighting device having a relatively large influence of the lighting amount on the position of its own local device may be repeatedly adjusted. Since such a lighting device is frequently located close to that position of the local device, repeatedly adjusting the dimmer level of the lighting device located close to that position may impose a large influence on the lighting amount of that position, but impose merely a small influence on the lighting amounts of other positions (frequently located away from the lighting device relatively large influence coefficient). Hence, people residing in the other positions may have satisfactory experiences without imposing excessive influences on their experiences of lighting. Since the amount of fine adjustment may be selectable, it may be possible to implement the effect of acquiring the final influence coefficient. However, the electric energy consumption and people's experiences are not necessarily optimal ones. This advantageous effect of the embodiment is only an example, and hence, the advantageous effect will not limit the embodiment.

In step S4015, the visible light source inside each of the lighting devices is caused to emit visible light based on the dimmer level after the visible light is finely adjusted.

In step S4016, the visible light sensor inside the local device is caused to measure the visible light amount $s^{new}$ after the fine adjustment.

The visible light amount measured after the visible light is finely adjusted by following the formula (10) is assumed as $s^{new} = 460$ (Lux).

In step S4017, the final influence coefficient of the lighting devices on the respective local devices may be obtained from the initial influence coefficients 12c, 8c, and 3c based on a relationship between the visible light amount $s^{new}$ after the fine adjustment and the visible light amount $s^{measured}$ before the fine adjustment (a constant c is obtained).

More specifically, an unknown constant c is computed by the following formula (11).

$$\begin{bmatrix} \hat{l}_1 \\ \hat{l}_2 \\ \hat{l}_3 \end{bmatrix} = \begin{bmatrix} l_1 \\ l_2 \\ l_3 \end{bmatrix} + \frac{1}{217c} \begin{bmatrix} 12 \\ 8 \\ 3 \end{bmatrix} (s^{target} - s^{measured}) \quad (11)$$

The following result (12) is computed by the formula (11).

$$c \approx 0.37 \quad (12)$$

Hence, the final influence coefficients are obtained as 12c=4.44, 8c=2.96, and 3c=1.11.

Referring to FIG. 4C, in step S4021, respective target dimmer levels $\hat{l}_1, \hat{l}_2, \hat{l}_3$ for reaching the target lighting amount $s^{target}$ for the lighting devices may be obtained based on the final influence coefficients 4.44, 2.96, and 1.11, and the target lighting amount $s^{target}$.

Specifically, the respective target dimmer levels $\hat{l}_1, \hat{l}_2, \hat{l}_3$ are obtained from the constant c as follows.

$$\hat{l}_1 = l_1 + \frac{12}{217c}(s^{target} - s^{measured}) = 32\% \quad (13)$$

$$\hat{l}_2 = l_2 + \frac{8}{217c}(s^{target} - s^{measured}) = 63\%$$

$$\hat{l}_3 = l_3 + \frac{3}{217c}(s^{target} - s^{measured}) = 66\%$$

In step S4022, the respective lighting devices 201 are caused to emit visible light based on the respective target dimmer levels of 32%, 63%, and 66% for causing the lighting devices 201 to reach the target lighting amount. As described above, the embodiment may be able to achieve the target lighting amount based on the optimal dimmer levels as well as eliminating flickering, reducing the electric energy consumption, and provide people with pleasant experiences. This advantageous effect of the embodiment is only an example, and hence, the advantageous effect will not limit the embodiment.

As described above, in the lighting control system according to the first embodiment, the influence of the lighting amounts of the lighting devices on the respective sensors may be simulated by causing the invisible beam emitting sources to emit the invisible beams simulating the characteristics of the visible light. In this configuration, it is not necessary to turn the visible light sources on. Accordingly, flickering due to turning on the visible light sources may be completely eliminated.

Further, the local device serving as a sensor of the first embodiment may be movable (portable). Hence, it is possible to reach or approach the target lighting amount at various positions of the local device while the local device is moving.

In the first embodiment, since the influence of the lighting amount from the respective lighting devices on the visible sensor of the local device, that is, the influence coefficients may be quickly obtained, it is possible to rapidly adjust dimmer levels to reach or approach the target lighting amount. Accordingly, excessive adjustment may be prevented.

Further, in the first embodiment, the fine adjustment of the dimmer levels for the respective lighting devices and the fine adjustment amounts are proportional to the influence coefficients. Hence, it may be possible to reach or approach the target lighting amount with a small amount of electric energy consumption by repeatedly adjusting the dimmer level of the lighting device imposing relatively large influence on a certain position. Accordingly, the electric energy consumption may be reduced. Further, adjusting the dimmer level of the lighting device close to the certain position may impose a large influence on the lighting amount at the certain position; however, influence on the lighting amount at other positions may be small. Accordingly, excessive influence will not be imposed on people's experience of lighting at other positions so as to provide people residing in other positions with pleasant experiences.

In the first embodiment, the respective invisible beam emitting sources are disposed in the lighting devices, and an invisible beam sensor is disposed in the local device at a certain position. The advantages of this configuration may be as follows. For example, since the invisible beam emitting source inside the lighting device is relatively close to the visible light source (the visible light is simulated by causing the invisible beams to approach a form of the visible light as much as possible), the emitted invisible beams may be able to simulate the characteristics or the propagating path of the visible light, and may further be able to cause the computed influence coefficients to approach more accurate values. However, such advantageous effects of the first embodiment may only be an example, and will not limit the first embodiment.

4. A Lighting Control System According to a Second Embodiment

Figure 5:
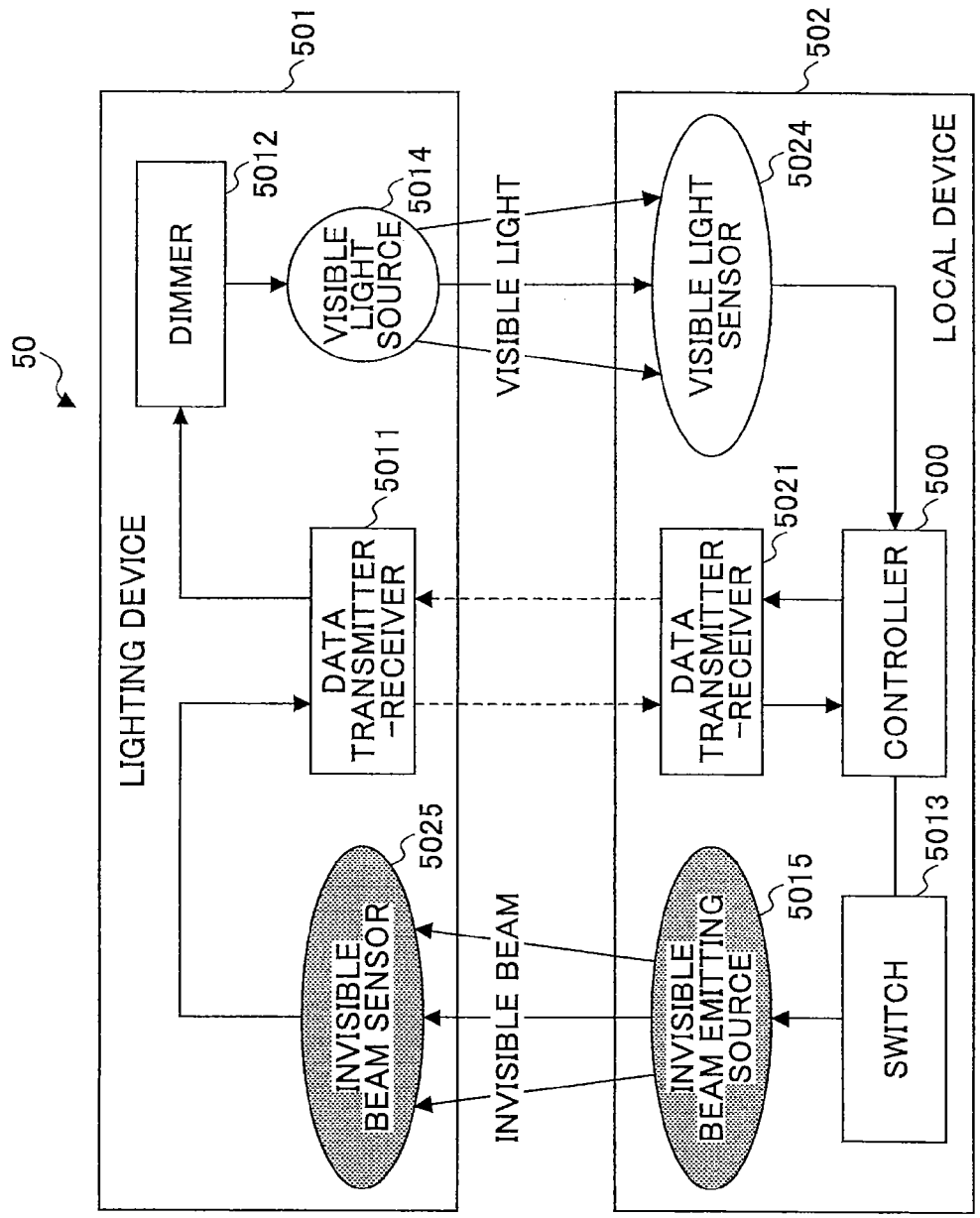
FIG. 5 is a block diagram illustrating an example of a lighting control system according to a second embodiment.

FIG. 5 is a diagram illustrating a lighting control system 50 according to a second embodiment. The lighting control system 50 according to the second embodiment illustrated in FIG. 5 differs from the lighting control system 30 according to the first embodiment illustrated in FIG. 3 in that the locations (positions) of the invisible beam emitting source 5015 and the invisible beam sensor 5025 illustrated in FIG. 5 differ from the locations of the invisible beam emitting source 3015 and the invisible beam sensor 3025 illustrated in FIG. 3. More specifically, in FIG. 5, the invisible beam emitting source 5015 is not placed in the lighting device 501 but resides in the local device 502, and the invisible beam sensor 5025 is not placed in the local device 502 but one resides in each of the lighting devices 501. This indicates that the characteristics of the visible light emitted from each of the lighting devices 501 toward the local device 502 that is the opposite direction are simulated by emitting the invisible beams from the local device 502 to each of the lighting devices 501. That is, when the invisible beam emitting source 5015 inside the local device 502 is activated once, the initial influence coefficient of each of the lighting devices 501 on the local device 502 is acquired by using the amount the invisible beams emitted from the invisible beam emitting source 5015 measured by the invisible beam sensor 5025 inside a corresponding one of the lighting devices 501. The amount of the invisible beams measured from the local device 502 to each of the lighting devices 501 is not necessarily completely the same as the characteristics of the visible light emitted from each of the lighting devices to the local device or the propagating path. Hence, each of the measured amounts of the invisible beams is not completely proportional to the initial influence coefficient. However, based on the principle of the optical path being reversible, when two objects are mutually visible, the intensity of light emitted from one of the objects is equal to the intensity of light received by the other one of the objects (the influence of the external emitting surface is excluded).

The advantage of such a configuration may be as follows. For example, it is not necessary to activate, as illustrated in the first embodiment, each of the invisible beam emitting sources inside the lighting devices when the invisible beam emitting source inside the local device 502 (as there is only one local device 502) is activated once. Accordingly, the initial influence coefficients may be acquired, and the efficiency is improved by the acquired initial influence coefficients. Further, it is not necessary to reduce the number of lighting devices. Hence, the efficiency will not be affected by an increase in the number of lighting devices. However, such advantageous effects of the second embodiment may only be an example, and will not limit the second embodiment.

Steps subsequent to the acquisition of the initial influence coefficients that are performed by the controller 500 inside the lighting control system 50 are omitted from the description because these step are similar to those illustrated in FIGS. 4A to 4C.

The examples of the above first and second embodiments illustrate one local device, and the central controller resides in this local device. However, the first and second embodiments are not limited to the above configuration but applied to examples in which plural local devices simultaneously located at different positions (each of the local devices includes a target lighting amount to reach or approach). Further, the central controller is not necessarily located in each of the local devices. The central controller may be located other than in each of the local devices or lighting devices. When the local device is one, the local device is configured to control all the plural controllers or plural lighting devices. In a configuration where there are plural local devices, one central controller may need to compute influence coefficients with respect to all the local devices to acquire optimal dimmer levels for the local devices to reach or approach the target visible light amounts. Next, a description is given in detail of the configuration in where there are plural local devices.

5. A Lighting Control System According to a Third Embodiment

Figure 6:
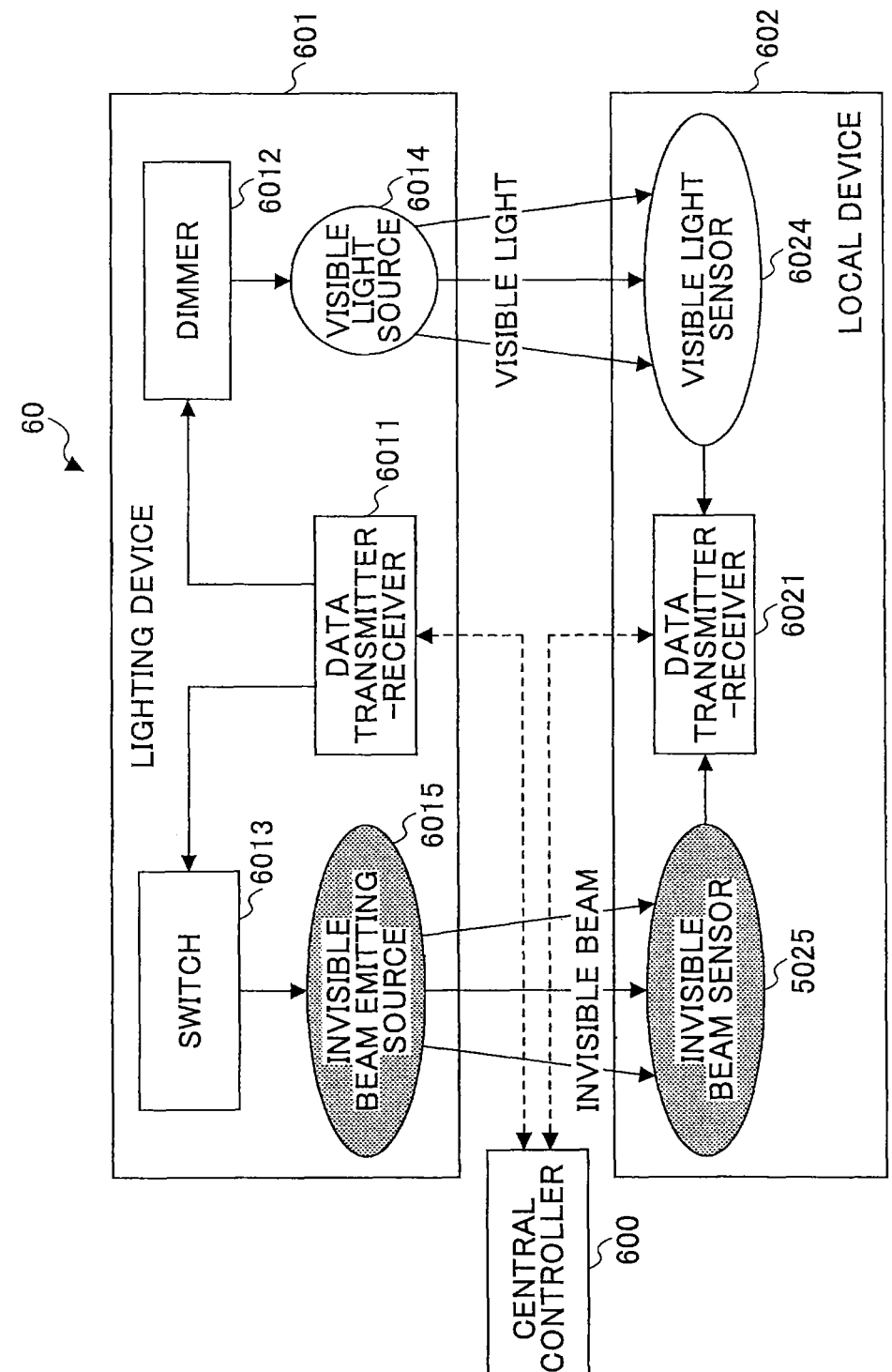
FIG. 6 is a block diagram illustrating an example of a lighting control system according to a third embodiment.

FIG. 6 is a diagram illustrating a lighting control system 60 according to a third embodiment. The lighting control system 60 according to the third embodiment illustrated in FIG. 6 differs from the lighting control system 30 according to the first embodiment illustrated in FIG. 3 in that the lighting control system 60 includes plural local devices 602, a central controller 600 is located outside the local devices 602 and lighting devices 601, and the central controller 600 is configured to communicate with all the local devices 602 and lighting devices 601 via a network and the like.

As described above, the plural local devices 602 are located at different positions, the central controller 600 computes the target dimmer levels of the local devices at different positions to reach the target lighting amount in each of the local devices based on the method performed on one local device in the first embodiment. Specific steps of the method may be illustrated as those in the first embodiment or those illustrated in detail below.

6. A Lighting Control System According to a Fourth Embodiment

Figure 7:
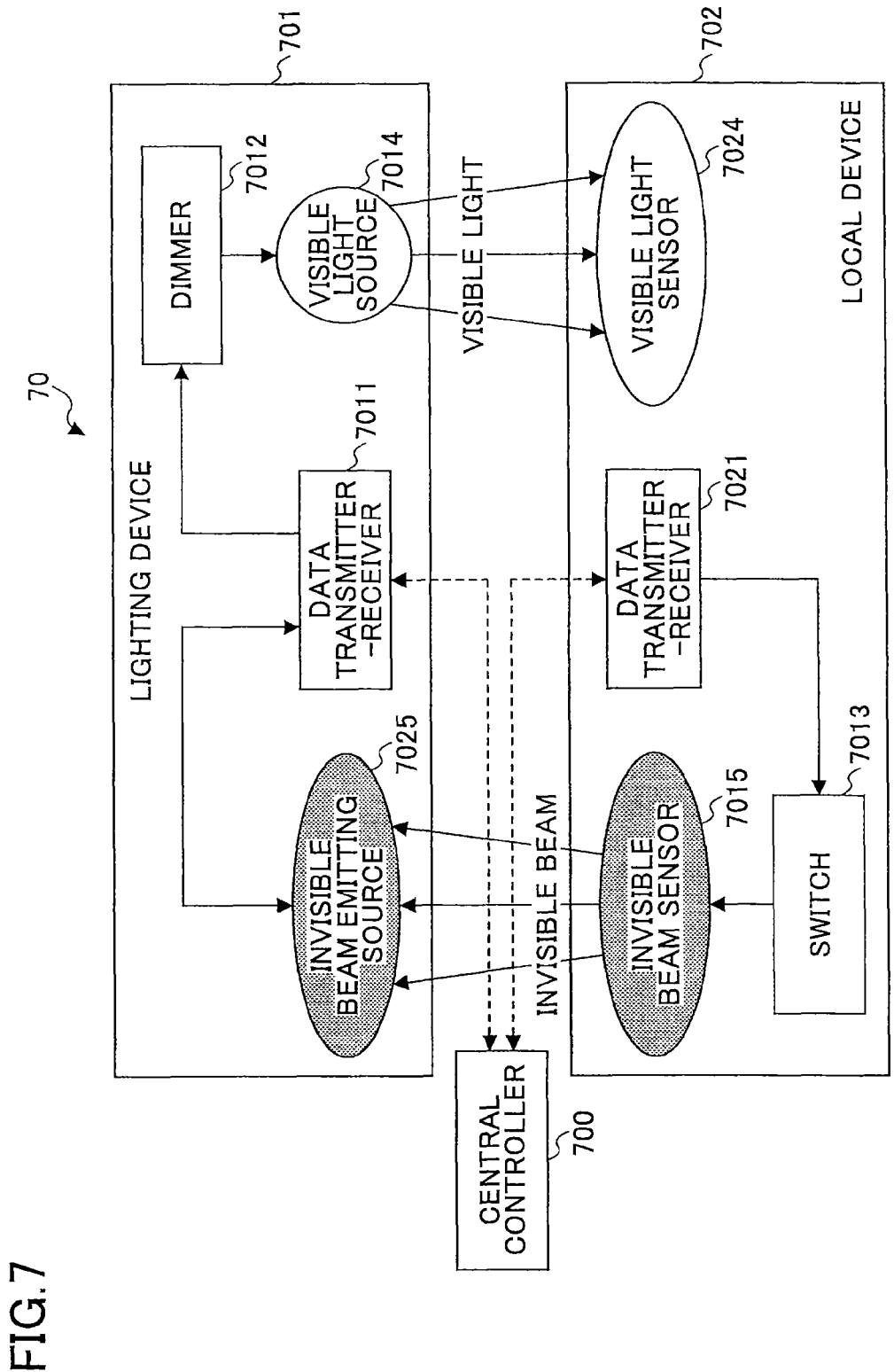
FIG. 7 is a block diagram illustrating an example of a lighting control system according to a fourth embodiment.

FIG. 7 is a diagram illustrating a lighting control system 70 according to a fourth embodiment. The lighting control system 70 according to the fourth embodiment illustrated in FIG. 7 differs from the lighting control system 40 according to the second embodiment illustrated in FIG. 4 in that the lighting control system 70 includes plural local devices 702, a central controller 700 is located outside the local devices 702 and lighting devices 701, and the central controller 700 is configured to communicate with all the local devices 702 and lighting devices 701 via a network and the like. Further, the lighting control system 70 according to the fourth embodiment illustrated in FIG. 7 differs from the lighting control system 60 according to the third embodiment illustrated in FIG. 6 in that the locations (positions) of the invisible beam emitting source 7015 and the invisible beam sensor 7025 illustrated in FIG. 7 differ from the locations of the invisible beam emitting source 6015 and the invisible beam sensor 6025 illustrated in FIG. 6. More specifically, in FIG. 7, the invisible beam emitting source 7015 is not placed in the lighting device 701 but resides in the local device 702, and the invisible beam sensor 7025 is not placed in the local device 702 but resides in each of the lighting devices 702. This indicates that the characteristics of the visible light emitted from each of the lighting devices 701 toward the local devices 702 that is the opposite direction are simulated by emitting the invisible beams from the local devices 702 to the respective lighting devices 701.

Next, a description is given of detailed steps of the lighting control method performed by the lighting control system 30 according to the third embodiment and the lighting control system 70 according to the fourth embodiment. However, the detailed steps illustrated below may only be examples and will not limit the third and fourth embodiments. Initially, it is assumed that there are m lighting devices and n local devices, where m and n are integers.

In the lighting control system 60 according to the third embodiment illustrated in FIG. 6 (in this example, an invisible beam emitting source resides inside a lighting device), an influence coefficient of the jth lighting device on the ith local device is assumed as $a_{ij}$. The matrix of the influence coefficient $a_{ij}$ (i=1, 2, ..., n, and j=1, 2, ..., m) is illustrated as follows.

$$\begin{bmatrix} a_{11} & a_{12} & \cdots & a_{1m} \\ a_{21} & a_{22} & \cdots & a_{2m} \\ \vdots & \vdots & \ddots & \vdots \\ a_{n1} & a_{n2} & \cdots & a_{nm} \end{bmatrix} = \begin{bmatrix} c_1 d_{11}^{received} & c_2 d_{12}^{received} & \cdots & c_m d_{1m}^{received} \\ c_1 d_{21}^{received} & c_2 d_{22}^{received} & \cdots & c_m d_{2m}^{received} \\ \vdots & \vdots & \ddots & \vdots \\ c_1 d_{n1}^{received} & c_2 d_{n2}^{received} & \cdots & c_m d_{nm}^{received} \end{bmatrix} \quad (14)$$

In the above (14), $d_{ij}^{received}$ represents the amount of invisible beams emitted from the jth lighting device that is measured by the ith local device, and cj represents an unknown constant.

Next, in the lighting control system 70 according to the third embodiment illustrated in FIG. 7 (in this example, an invisible beam emitting source resides inside a lighting device), an influence coefficient of the jth lighting device on the ith local device is assumed as $a_{ij}$. The matrix of the influence coefficient $a_{ij}$ (i=1, 2, ..., n, and j=1, 2, ..., m) is illustrated as follows.

$$\begin{bmatrix} a_{11} & a_{12} & \cdots & a_{1m} \\ a_{21} & a_{22} & \cdots & a_{2m} \\ \vdots & \vdots & \ddots & \vdots \\ a_{n1} & a_{n2} & \cdots & a_{nm} \end{bmatrix} = \begin{bmatrix} c_1 d_{11}^{received} & c_1 d_{12}^{received} & \cdots & c_1 d_{1m}^{received} \\ c_2 d_{21}^{received} & c_2 d_{22}^{received} & \cdots & c_2 d_{2m}^{received} \\ \vdots & \vdots & \ddots & \vdots \\ c_n d_{n1}^{received} & c_n d_{n2}^{received} & \cdots & c_n d_{nm}^{received} \end{bmatrix} \quad (15)$$

In the above (15), $d_{ij}^{received}$ represents the amount of invisible beams emitted from the jth local device that is measured by the ith lighting device, and ci represents an unknown constant.

As illustrated above, the unknown parameter ci or cj may be computed by gradually and finely adjusting the dimmer level with respect to each of the lighting devices in a direction toward the target lighting amount, and causing a corresponding one of the visible sensors to measure the change in the amount of the visible light. The methods of the fine adjustments and computation of parameters are already illustrated above, and hence, repeated descriptions of those methods will be omitted.

After the computation of the unknown parameter ci or cj, the matrix of the influence coefficients is computed. The target dimmer levels are then acquired by the following formula (16).

$$\begin{bmatrix} \hat{l}_1 \\ \hat{l}_2 \\ \vdots \\ \hat{l}_m \end{bmatrix} = \begin{bmatrix} l_1 \\ l_2 \\ \vdots \\ l_m \end{bmatrix} + \begin{bmatrix} a_{11} & a_{12} & \ldots & a_{1m} \\ a_{21} & a_{22} & \ldots & a_{2m} \\ \vdots & \vdots & \ddots & \vdots \\ a_{n1} & a_{n2} & \ldots & a_{nm} \end{bmatrix}^+ \begin{bmatrix} s_1^{target} - s_1^{measured} \\ s_2^{target} - s_2^{measured} \\ \vdots \\ s_n^{target} - s_n^{measured} \end{bmatrix} \quad (16)$$

In the above equation (16), $s_k^{measured}$ represents the amount of visible light measured by the visible sensor k, where k=1, 2, ..., n.

Further, $s_k^{target}$ represents a target lighting amount at a position of the visible sensor k, where k=1, 2, ..., n.

In addition, $l_{k'}$ represents a current dimmer level k', where k'=1, 2, ..., m.

Further, $\hat{l}_{k'}$ represents a target dimmer level with respect to the visible light source k', where k'=1, 2, ..., m.

Moreover, "+" represents a pseudo-inverse matrix.

All the applicable computational methods that include, but are not limited to, an SVC (singular-value decomposition) may be used to compute the pseudo-inverse matrix corresponding to a matrix of the influence coefficients.

The dimmer level in each of the lighting devices to reach a corresponding one of the target lighting amounts may thus be acquired. Each of the lighting devices 601 or each of the lighting devices 701 is caused to emit visible light based on a corresponding one of the target dimmer levels of the lighting devices, and the visible light amount measured in each of the local devices is caused to reach a corresponding one of the target lighting amounts.

In the lighting control system and the lighting control method according to the third and fourth embodiments, the influence of the lighting amounts of the lighting devices on the respective sensors may be simulated by causing the invisible beam emitting sources to emit the invisible beams simulating the characteristics of the visible light. In this configuration, it is not necessary to turn the visible light sources on. Accordingly, flickering due to turning on the visible light sources may be completely eliminated.

Further, the local device serving as a sensor of the third and fourth embodiments may be movable (portable). Hence, it is possible to reach or approach the target lighting amount at various positions of the local device while the local device is moving.

Further, in the third and fourth embodiments, since the influence of the lighting amount from the respective lighting devices on the visible sensor of the local device, that is, the influence coefficients, may be quickly obtained, it is possible to rapidly adjust dimmer levels to reach or approach the target lighting amount. Accordingly, excessive adjustment may be prevented.

Further, in the third and fourth embodiments, the fine adjustment of the dimmer levels for the respective lighting devices and the fine adjustment amounts are proportional to the influence coefficients. Hence, it may be possible to reach or approach the target lighting amount with a small amount of electric energy consumption by repeatedly adjusting the dimmer level of the lighting device imposing relatively large influence on a certain position. Accordingly, the electric energy consumption may be reduced. Further, adjusting the dimmer level of the lighting device close to the certain position may impose a large influence on the lighting amount at the certain position; however, influence on the lighting amount at other positions may be small. Accordingly, excessive influence will not be imposed on people's experience of lighting at other positions so as to provide people residing in other positions with pleasant experiences.

In the first and third embodiments, the respective invisible beam emitting sources are disposed in the lighting devices, and an invisible beam sensor is disposed in the local device at a certain position. The advantages of this configuration may be as follows. For example, since the invisible beam emitting source inside the lighting device is relatively close to the visible light source (the position and beam form), the emitted invisible beams may be able to simulate the characteristics or the propagating path of the visible light, and may further be able to cause the computed influence coefficients to approach more accurate values.

As described above, the lighting control system and the lighting control method according to the third and the fourth embodiments may be able to cause the visible light amounts at different positions to simultaneously reach or approach the respective target lighting amounts by using, for example, the plural local devices in addition to the advantageous effects and benefits achieved by the first and the second embodiments. At the same time, one central controller may intensively manage different requests between the different local devices to prevent collisions of the requests. The central controller may be controlled by various methods including, but not limited to, the existing remote control technologies (e.g., mobile technologies).

These advantageous effects of these embodiments are only examples, and will not limit these embodiments.

7. A Lighting Control Method According to an Embodiment

Referring back to FIG. 4A, FIG. 4A illustrates an example of a lighting control method 400 according to an embodiment. The lighting control method 400 includes steps S401 and S402. In step S401, an influence coefficient of each of the lighting devices on a corresponding one of the local devices is acquired based on the measured invisible beam amount and the visible light amount, where the influence coefficient represents an influence level of each of the lighting devices on a corresponding one of the local devices.

In step S402, dimmer levels of the plural visible light sources are acquired based on the influence coefficients, and the visible light amount measured by at least one local device is controlled such that the measured visible light amount reaches or approaches the target lighting amount of that local device.

8. A Lighting Device According to an Embodiment

Figure 8:
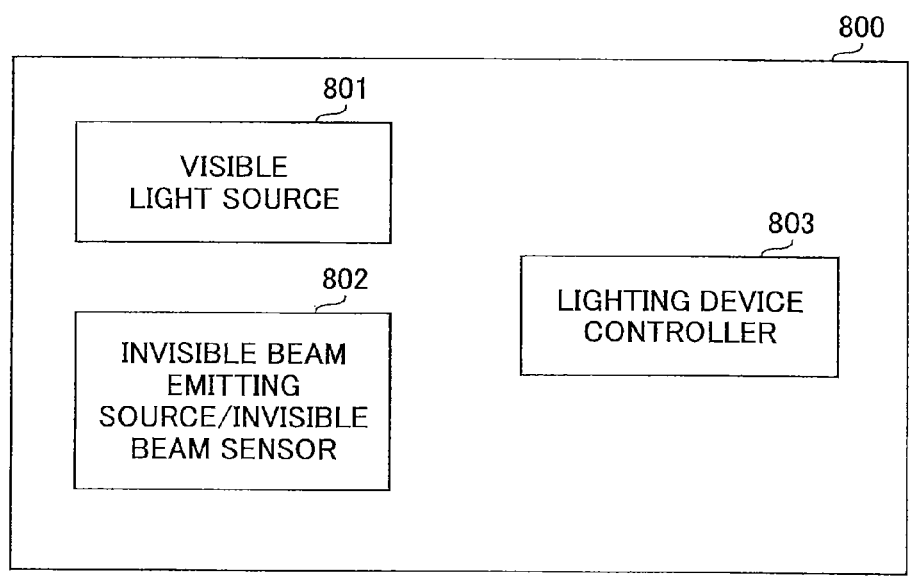
FIG. 8 is a block diagram illustrating an example of a lighting device according to an embodiment.

FIG. 8 is a block diagram illustrating an example of a lighting control device 800 according to an embodiment.

As illustrated in FIG. 8, the lighting control device 800 includes a visible light source 801 for emitting visible light to at least one local device based on each of the dimmer levels; one of an invisible beam emitting source for emitting invisible beams simulating characteristics of the visible light and an invisible beam sensor for measuring the amount of the invisible beams emitted from the invisible beam emitting source (an invisible beam emitting source/invisible beam sensor)

802, the other one of the invisible beam emitting source and the invisible beam sensor (the invisible beam emitting source/invisible beam sensor) 802 being located inside the at least one of the local devices and used for acquiring an influence coefficient of each of lighting devices on a corresponding one of the local devices based on the measured invisible beam amount and the visible light amount, each of the influence coefficients representing influence degrees of visible light amount of one of the lighting devices on the at least one of the local devices; and a lighting controller 803 configured to acquire a target dimmer levels of the visible light sources based on the acquired influence coefficient to cause the visible light amount measured at a position of the at least one of the local devices to reach or approach a target lighting amount in at least one of the local devices.

9. A Local Device According to an Embodiment.

Figure 9:
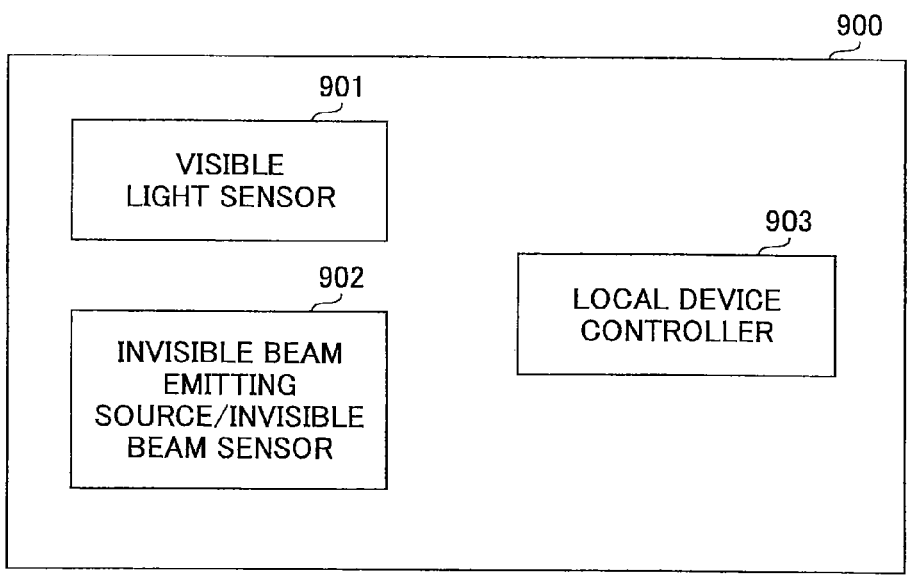
FIG. 9 is a block diagram illustrating an example of a local device according to an embodiment.

FIG. 9 is a block diagram illustrating an example of a local device according to an embodiment.

As illustrated in FIG. 9, the local device 900 includes a visible light sensor 901 for measuring respective amounts of visible light emitted from plural lighting devices; one of an invisible beam emitting source for emitting invisible beams simulating characteristics of the visible light and an invisible beam sensor for measuring the amount of the invisible beams emitted from the invisible beam emitting source (an invisible beam emitting source/invisible beam sensor) 902, the other one of the invisible beam emitting source and the invisible beam sensor (the invisible beam emitting source/invisible beam sensor) 902 being located inside each of lighting devices and used for acquiring an influence coefficient of each of the lighting devices on a corresponding one of the local devices based on the measured invisible beam amount and the visible light amount, each of the influence coefficients representing influence degrees of visible light amount of one of the lighting devices on a corresponding one of the local devices; and a lighting controller 903 configured to transfer target dimmer levels of respective visible light sources to the lighting devices based on the acquired influence coefficients to cause the visible light amount measured at a position of at least one of the local devices to reach or approach a target lighting amount in the at least one of the local devices.

As described above, each of the above-described embodiments may be capable of preventing flickering of light with a rapid operation and efficiently reducing electric energy consumption. However, the effects obtained in the above-described embodiments are only examples and do not limit these embodiments.

The "benefits", "effects", "advantages", and other descriptions related to the effects disclosed above are only examples and do not limit the above-described embodiments.

The respective block diagrams exemplifying the components, devices, apparatuses, and systems are only examples, and not suggested or intended to be connected, arranged, and configured according to the manners illustrated in the block diagrams. Further, parts of the components, devices, apparatuses, and systems are illustrated in the respective exemplified block diagrams of the disclosures. However, these parts are not to be construed as necessary components (e.g., switches, data transmitter-receivers, dimmers, etc.) that limit the above-described embodiments. Further, locations (positions) and connecting methods of the components, devices, apparatuses, and systems illustrated in the respective exemplified block diagrams of the disclosures are only examples, and the components, devices, apparatuses, and systems may be connected, arranged, or configured in any method known by those skilled in the art. Further, the terms "comprise", "include", "contain", "have", and the like are open-ended terms that indicate meaning of "include but not limited to", and these terms may be interchangeably used. In addition, terms "and" and "or" indicate meaning of "and/or", and these terms may be interchangeably used. That is, these terms may be interchangeably construed unless explicitly indicated specifically as "and" or "or" in the contexts. The term "for example" includes meaning of "for example, but not limited to" and these terms may be interchangeably used.

The steps in the flowchart and methods disclosed above are only examples, and are not suggested or intended to be limited to the order of steps disclosed in the above embodiments. These steps and methods may be performed in any order or the order known by those skilled in the art. For example, the terms "subsequently", "then", "next", and the like are not intended to limit the order of the disclosed steps. These terms are used for the purpose of facilitating readability of a reader. In addition, articles or determiners such as "one", "a", or "the" used with a singular element do not limit the meaning to a singular element.

Providing illustration more than the disclosures may enable those skilled in the art to create or use the invention of the present invention.

Various modifications in these directions may be obvious to those skilled in the art and a theorem defined herein may be applied to other directions without departing from the scope of the present invention. Hence, the invention is not limited to the directions indicated above, but is applied in a broadest range of new features that match the disclosed theorem.

The present invention is not limited to the specifically disclosed embodiments, and variations and modifications may be made without departing from the scope of the present invention.

The present application is based on and claims the benefit of priority of Chinese priority application No. 201310075695.5 filed on Mar. 11, 2013, the entire contents of which are hereby incorporated herein by reference.

What is claimed is:

1. A lighting control method for use in a lighting control system, the lighting control system including a plurality of lighting devices each including visible light sources for emitting visible light based on dimmer levels of the respective lighting devices; and at least one local device including a visible light sensor for measuring an amount of visible light in the at least one local device, one of the lighting devices and the at least one local device including an invisible beam emitting source for emitting invisible beams simulating characteristics of visible light, and another of the lighting devices and the at least one local device including an invisible beam sensor for measuring an amount of invisible beams emitted from the invisible beam emitting source, the lighting control method comprising:

acquiring an influence coefficient of each of the lighting devices on the at least one local device based on the measured amount of invisible beams and the measured amount of visible light, wherein the influence coefficient represents an influence level of the each of the lighting devices on the at least one local device; and acquiring a dimmer level of each of the visible light sources based on a corresponding one of the influence coefficients to control the amount of the visible light measured at a position of the at least one local device such that the measured amount of the visible light reaches or approaches a target lighting amount of the at least one local device.

2. The lighting control method as claimed in claim 1, wherein
the acquiring the influence coefficient includes
sequentially causing each of the invisible beam emitting sources to emit invisible beams;
causing each of the invisible beam sensors to measure the amount of the invisible beams sequentially emitted from the respective invisible beam emitting sources to acquire an initial influence coefficient of a corresponding one of the lighting devices on the at least one local device;
acquiring the target lighting amount in the at least one local device;
finely adjusting the dimmer level with respect to each of the lighting devices in a direction toward the target lighting amount;
causing the visible light source inside each of the lighting devices to emit finely adjusted visible light based on the finely adjusted dimmer level;
causing each of the visible light sensors inside the at least one local device to measure an amount of the finely adjusted visible light emitted from the respective visible light sources; and
acquiring a final influence coefficient of each of the lighting devices on the at least one local device based on a relationship between the amount of the visible light before being finely adjusted and the amount of the visible light after being finely adjusted, and based on the initial influence coefficient of the each of the lighting devices on the at least one local device.

3. The lighting control method as claimed in claim 2, wherein
the measured amount of the invisible beams sequentially emitted from the respective invisible beam emitting sources measured by the each of the invisible beam sensors is proportional to a corresponding one of the final influence coefficients.

4. The lighting control method as claimed in claim 2, wherein
one of an amount of the finely adjusted dimmer level with respect to the respective lighting devices for reaching or approaching a target lighting amount of the local device and an amount of the adjusted dimmer level for reaching or approaching the target lighting amount is proportional to the initial influence coefficient and the final influence coefficient of the respective lighting devices on the at least one local device.

5. The lighting control method as claimed in claim 1, wherein
the acquiring the dimmer level includes
acquiring a target dimmer level in each of the lighting devices for reaching or approaching the target lighting amount based on a final influence coefficient and the target lighting amount; and
causing each of the lighting devices to emit visible light based on the target dimmer level therein for reaching or approaching the target lighting amount.

6. A lighting control system, comprising:
a plurality of lighting devices each including visible light sources for emitting visible light based on dimmer levels of the visible light sources;
at least one local device including a visible light sensor for measuring an amount of visible light in the at least one local device, one of the lighting devices and the at least one local device including an invisible beam source for emitting invisible beams simulating characteristics of visible light, and another of the lighting devices and the at least one local device including an invisible beam sensor for measuring an amount of invisible beams emitted from the invisible beam emitting source; and
a controller configured to acquire an influence coefficient of each of the lighting devices on the at least one local device based on the measured amount of the invisible beams and the measured amount of visible light, the influence coefficient representing an influence level of the lighting devices on the at least one local device, and to acquire a dimmer level of each of the visible light sources based on a corresponding one of the influence coefficients to control the amount of the visible light measured at a position of the at least one local device such that the measured amount of the visible light reaches or approaches a target lighting amount in the at least one local device.

7. The lighting control system as claimed in claim 6, wherein the controller
sequentially causes each of the invisible beam emitting sources to emit invisible beams;
causes each of the invisible beam sensors to measure the amount of the invisible beams sequentially emitted from the respective invisible beam emitting sources to acquire an initial influence coefficient of each of the lighting devices on the at least one local device;
acquires the target lighting amount in the at least one local device;
finely adjusts the dimmer level with respect to each of the lighting devices in a direction toward the target lighting amount;
causes the visible light source inside each of the lighting devices to emit finely adjusted visible light based on the finely adjusted dimmer level;
causes each of the visible light sensors inside the at least one local device to measure an amount of the finely adjusted visible light emitted from the respective visible light sources; and
acquires an influence coefficient of each of the lighting devices on the at least one local device based on the measured amount of the invisible beams and the measured amount of the visible light by acquiring a final influence coefficient of each of the lighting devices on the at least one local device based on a relationship between the amount of the visible light before being finely adjusted and the amount of the visible light after being finely adjusted, and based on the initial influence coefficient of the each of the lighting devices on the at least one local device.

8. The lighting control system as claimed in claim 6, wherein the controller
acquires a target dimmer level in each of the lighting devices for reaching or approaching the target lighting amount based on a final influence coefficient and the target lighting amount; and
causes each of the lighting devices to emit visible light based on the target dimmer level in each of the lighting devices for reaching or approaching the target lighting amount and acquires a dimmer level of each of the visible light sources based on a corresponding one of the influence coefficients so as to control the amount of the visible light measured at a position of the at least one local device such that the measured amount of the visible light reaches or approaches the target lighting amount in the at least one local device.

9. A lighting device, comprising:
visible light sources for emitting visible light to at least one local device based on a dimmer level thereof;
an invisible light beam emitting source for emitting invisible beams simulating characteristics of visible light;
an invisible beam sensor for measuring an amount of invisible beams emitted from the invisible light beam emitting source, the invisible light beam emitting source and the invisible beam sensor being located inside the at least one local device; and
a lighting device controller configured to acquire an influence coefficient of the lighting device based on the measured amount of invisible beams and an amount of visible light measured by the at least one local device, the influence coefficient representing an influence level of the lighting device on the at least one local device, and to acquire a dimmer levels of the visible light sources based on the influence coefficient to control the amount of the visible light measured at a position of the at least one local device such that the measured amount of the visible light reaches or approaches a target lighting amount in the at least one local device.

10. A local device, comprising:
a visible light sensor for measuring an amount of visible light emitted from a plurality of lighting devices;
an invisible light beam emitting source for emitting invisible beams simulating characteristics of visible light;
an invisible beam sensor for measuring an amount of invisible beams emitted from the invisible light beam emitting source, the invisible light beam emitting source and the invisible beam sensor being located inside each of the lighting devices; and
a local device controller configured to acquire an influence coefficient of each of the lighting devices on the local device based on the measured amount of the invisible beams and the measured amount of visible light, the influence coefficient representing an influence level of each of the lighting devices on the local device, and to transfer target dimmer levels of respective visible light sources to the lighting devices based on the acquired influence coefficients to cause the visible light amount measured by the local device to reach or approach a target lighting amount in the local device.

* * * * *